(12) United States Patent
Hofrichter et al.

(10) Patent No.: US 8,191,103 B2
(45) Date of Patent: May 29, 2012

(54) REAL-TIME BOOKMARKING OF STREAMING MEDIA ASSETS

(75) Inventors: Klaus Hofrichter, Santa Clara, CA (US); Richter A. Rafey, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1112 days.

(21) Appl. No.: 11/031,842

(22) Filed: Jan. 6, 2005

(65) Prior Publication Data

US 2005/0183119 A1  Aug. 18, 2005

Related U.S. Application Data

(63) Continuation of application No. 09/651,433, filed on Aug. 30, 2000, now abandoned.

(51) Int. Cl.
*H04N 7/16* (2011.01)
(52) U.S. Cl. ......... 725/142; 725/139; 725/134; 725/131
(58) Field of Classification Search ............... 725/87, 725/142, 139, 134
See application file for complete search history.

(56) References Cited

U.S. PATENT DOCUMENTS

| | | | |
|---|---|---|---|
| 4,745,549 A | 5/1988 | Hashimoto | |
| 4,775,935 A * | 10/1988 | Yourick | 715/811 |
| 4,965,825 A | 10/1990 | Harvey et al. | |
| 5,223,924 A | 6/1993 | Strubbe | |
| 5,231,494 A | 7/1993 | Wachob | |
| 5,353,121 A * | 10/1994 | Young et al. | 725/52 |
| 5,371,551 A | 12/1994 | Logan et al. | |
| 5,481,296 A | 1/1996 | Cragun et al. | |
| 5,534,911 A | 7/1996 | Levitan | |
| 5,553,281 A * | 9/1996 | Brown et al. | 715/209 |
| 5,614,940 A | 3/1997 | Cobbley et al. | |
| 5,619,249 A * | 4/1997 | Billock et al. | 725/100 |
| 5,625,464 A | 4/1997 | Compoint et al. | |
| 5,635,979 A | 6/1997 | Kostreski et al. | |
| 5,638,443 A | 6/1997 | Stefik et al. | |
| 5,699,107 A | 12/1997 | Lawler et al. | |
| 5,740,549 A | 4/1998 | Reilly et al. | |
| 5,758,257 A | 5/1998 | Herz et al. | |
| 5,758,259 A | 5/1998 | Lawler | |
| 5,797,010 A | 8/1998 | Brown | |
| 5,826,102 A | 10/1998 | Escobar et al. | |
| 5,852,435 A | 12/1998 | Vigneaux et al. | |
| 5,861,906 A * | 1/1999 | Dunn et al. | 725/87 |
| 5,884,056 A | 3/1999 | Steele | |
| 5,900,905 A * | 5/1999 | Shoff et al. | 725/91 |
| 6,029,045 A | 2/2000 | Picco et al. | |
| 6,064,380 A | 5/2000 | Swenson et al. | 715/500.1 |

(Continued)

OTHER PUBLICATIONS

"Automatic Construction of Personalized TV News Programs," Association of Computing Machinery (ACM) Multimedia Conf., 323-331 (Presented Nov. 3, 1999).*

(Continued)

*Primary Examiner* — Kieu Oanh T Bui
*Assistant Examiner* — Fernando Alcon
(74) *Attorney, Agent, or Firm* — Blakely, Sokoloff, Taylor & Zafman LLP (57) ABSTRACT

A method for real-time bookmarking of streaming media assets is disclosed. In one embodiment, the method includes dynamically changing a presentation segment of a plurality of segments based one or more bookmark signals from a viewer.

30 Claims, 7 Drawing Sheets

U.S. PATENT DOCUMENTS

| | | |
|---|---|---|
| 6,084,581 A | 7/2000 | Hunt |
| 6,144,375 A | 11/2000 | Jain et al. .................. 715/500.1 |
| 6,160,570 A | 12/2000 | Sitnik |
| 6,236,395 B1 | 5/2001 | Sezan et al. .................. 345/723 |
| 6,243,725 B1 * | 6/2001 | Hempleman et al. ......... 715/210 |
| 6,269,369 B1 | 7/2001 | Robertson |
| 6,289,346 B1 | 9/2001 | Milewski et al. ............... 707/10 |
| 6,366,296 B1 | 4/2002 | Boreczky et al. ............. 345/719 |
| 6,377,861 B1 * | 4/2002 | York .............................. 700/83 |
| 6,460,036 B1 | 10/2002 | Herz |
| 6,463,444 B1 | 10/2002 | Jain et al. .................. 707/104.1 |
| 6,483,986 B1 | 11/2002 | Krapf ............................. 386/68 |
| 6,574,378 B1 | 6/2003 | Lim |
| 6,848,002 B1 | 1/2005 | Detlef |
| 2002/0023230 A1 | 2/2002 | Bolnick et al. |
| 2002/0170068 A1 | 11/2002 | Rafey et al. |
| 2002/0194260 A1 * | 12/2002 | Headley et al. ............... 709/203 |
| 2003/0174861 A1 | 9/2003 | Levy et al. |
| 2006/0212900 A1 | 9/2006 | Ismail et al. |

OTHER PUBLICATIONS

Electronic House Com, EchoStart Communications Corporation and Geocast Network Systems Align to Deliver New Personalized Interactive Broadband Services to PC Users Via Satellite, Jun. 4, 2002, http://209.6.10.99/news101600echostar.html, 3 pages.

Lost Remote, The TV Revolution is Coming, Lost Remote TV New Media & Television Convergence News, TV News Gets (too?) Personal by Cory Bergman, Sep. 25, 2000, http://www.lostremote.com/producer/personal.html, 2 pages.

* cited by examiner

CONFIGURATION A: TRADITIONAL

CONFIGURATION B: INTEGRATED

CONFIGURATION C: STACKED

REAL-TIME BOOKMARKING OF STREAMING MEDIA ASSETS

RELATED APPLICATION

This application is a continuation application of Ser. No. 09/651,433, filed Aug. 30, 2000 now abandoned.

FIELD OF INVENTION

The invention is related to audio/video storage and multimedia presentation systems.

BACKGROUND OF THE INVENTION

A multimedia presentation system enables a viewer to select one or more segments to watch by displaying a series of teasers, or short clips, that describe the segments.

In some systems, the teasers are presented first, followed by the full stories. The user can interact with the presentation engine to influence the presentation sequence by either jumping to a specific story during the presentation of the respective teaser or by skipping a story to continue with the next story, or another continuation point.

The problem with this system is that this system only allows changing the "position-pointer" in an ongoing presentation. There is also no real indexing to the stories. The viewer is unable to setup a presentation sequence dynamically for passive viewing afterwards.

SUMMARY OF THE INVENTION

A method for real-time bookmarking of streaming media assets is disclosed. In one embodiment, the method includes dynamically changing a presentation sequence of a plurality of video segments based on one or more bookmark signals from a viewer.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method for real-time bookmarking of streaming media assets is disclosed. In one embodiment, the method includes dynamically changing the presentation order of a plurality of video segments based on one or more bookmark signals from a viewer.

An advantage of this method is that the viewer receives a full overview of the available segment material. It is not necessary for the viewer to revisit the teasers to access other segment content of interest. The viewer can easily and dynamically determine the presentation sequence for subsequent passive and customized viewing.

An apparatus, such as an interactive service module, can present television segments to a viewer on demand. The interactive service module can perform a method for real-time bookmarking of streaming media assets. The interactive service module may include a tuner to receive data for television segments, and a computer readable memory to store the segment data. Teasers associated with each segment may also be received by the tuner and stored in memory. Metadata may be used to identify each segment and its corresponding teaser. The metadata may also be received by the tuner and stored in memory. The metadata may be used to enable the viewer to control the presentation order of several segments that are displayed to the viewer. A presentation engine of the interactive service module may present the content based on viewer preferences.

For example, digital Audio/Video (AV) content material, e.g. video clips representing a television news segment, may be available to the interactive service module from random access storage, either locally or through a network. For each story, represented by one or more video clips, an additional teaser video clip is available from storage. Alternatively, a table of contents (TOC) can be retrieved from storage. A teaser clip introduces a single story and gives an impression about the topic of the story. Descriptive metadata may be used by the interactive service module to identify separate stories in the video material and to identify their corresponding teasers.

A dynamic navigation mechanism to perform real-time bookmarking may be executed by the interactive service module. The mechanism enables a viewer to send a signal to the presentation engine during the presentation of a teaser indicating that the corresponding story is of interest. The presentation of the teasers continues until all teasers have been presented, but the subsequent presentation structure of the corresponding stories is changed according to the viewer's bookmark signals. This results in a customized presentation of the bookmarked stories.

Figure 1:
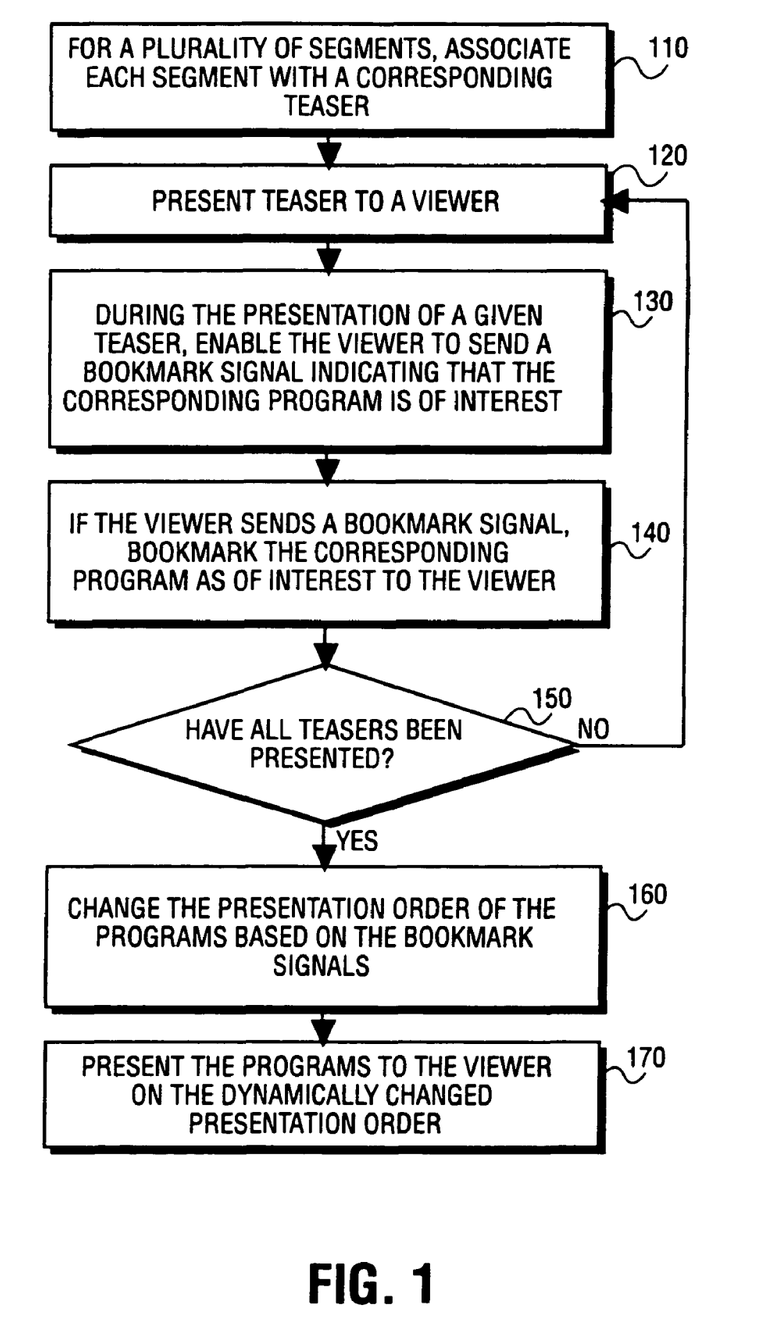
FIG. 1 shows an embodiment of a method for bookmarking.

A method for bookmarking is shown in FIG. 1. For a plurality of segments, each segment is associated with a corresponding teaser, step 110. Each teaser is displayed to the viewer in a sequential order, step 120. During the presentation of a given teaser, the viewer is enabled to send a bookmark signal indicating that the corresponding segment or story, is of interest, step 130. If the viewer sends a bookmark signal, the corresponding segment is bookmarked as of interest to the viewer, step 140. The method determines whether all teasers have been presented to the viewer, step 150. If not, the next teaser in the sequential order is displayed and steps 120 through 150 are repeated. If all teasers have been presented, then the presentation order of the segments is dynamically changed based on the bookmark signals, step 160. For example, the programs that are bookmarked may be displayed before the programs that are not bookmarked. The segments are presented to the viewer in the dynamically changed presentation order, step 170.

Alternatively, instead of sending a bookmark signal to indicate that the story is of interest, a viewer can send a signal to indicate that the story is not of interest. The "not of interest" signal can be used to place the corresponding story at a later position in the presentation sequence, or to remove the story entirely from the presentation sequence. A neutral signal may also be sent to indicate that the viewer is neither interested nor uninterested in the corresponding program.

The method for bookmarking and dynamically changing of the presentation order is not limited to bookmarking during the teaser presentation. In one embodiment, the method for bookmarking may also be used during a presentation of a story to indicate that the current story is of interest, but should be presented later or with reduced priority. Thus, this enables the viewer to postpone the presentation of the current story, and changes the presentation order dynamically.

In one embodiment, a method to bookmark or postpone a story is not limited to a television news segment environment. The method can be applied to situations where a streaming media presentation order is dynamically changed based on viewer input, such as a table of contents of a video library, a music video, or an audio-only application, for example.

Figure 2:
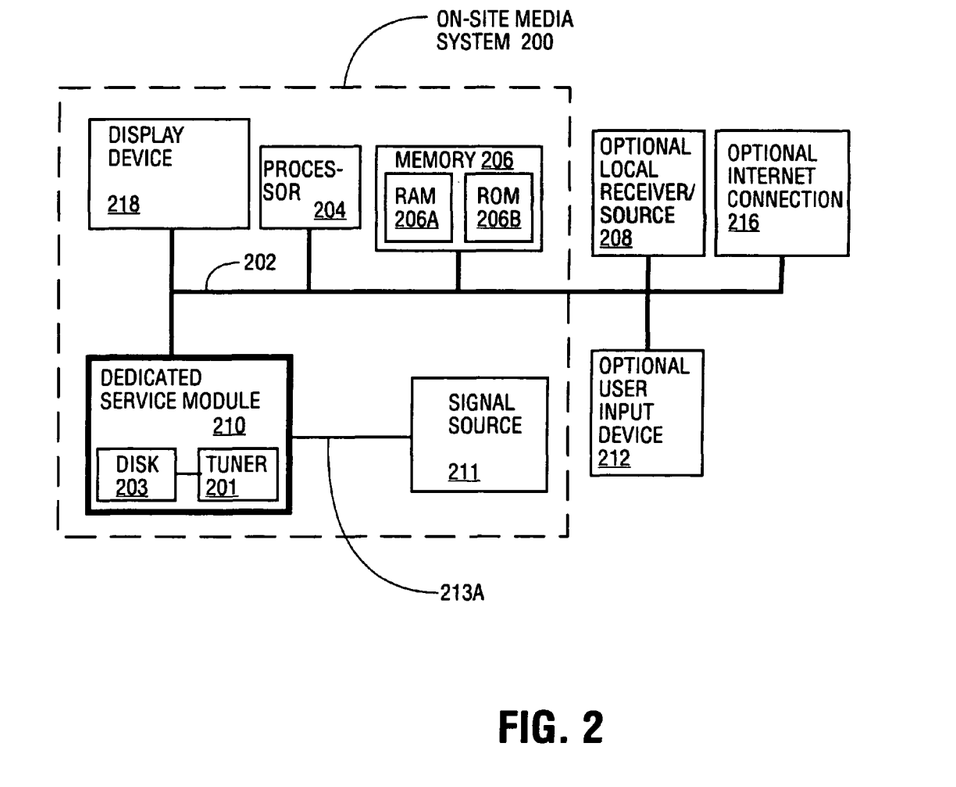
FIG. 2 is a block diagram of an on-site media system having a dedicated service module.

FIGS. 2 through 5 show embodiments of an interactive service module for real-time bookmarking of streaming media assets. Referring now to FIG. 2, a block diagram of an on-site media system having a dedicated service module is shown, in accordance with one embodiment of the present invention. To provide a context for the dedicated service module, on-site media system 200 shows one embodiment of a larger system in which the dedicated service module may be implemented to provide a dedicated on-site media service. On-site media system 200 includes a control/data bus 202 for communicating information, a central processor unit 204 for processing information and instructions, coupled to bus 202, and a memory unit 206 for storing information and instructions, coupled to bus 202. Memory unit 206 can include random access memory (RAM) 206a, for storing temporal information and instructions for central processor unit 204, and read only memory (ROM) 206b, for storing static information and instructions for central processor unit 204. System 200 also includes a display device 218 coupled to bus 202, for viewing data, and a signal source 212, coupled to dedicated service module 210 via line 213a for providing a signal.

On-site media system 200 also includes a dedicated service module 210, coupled to bus 202, to provide a media signal. Dedicated service module 210 can also be referred to as a dedicated media device or a dedicated service cartridge, depending on its specific configuration. Dedicated service module 210, enables the on-site media service to be implemented by providing dedicated tuning and guaranteed storage for a broadcast signal. The dedicated tuning provides a dedicated path from the broadcast stream into the guaranteed storage device. More specifically, dedicated service module 210 includes one or more dedicated tuners and one or more dedicated media storage devices, coupled to each other. More details of dedicated service module 210 are provided in subsequent figures. Dedicated service module 210 can allow for proprietary encoding of service information in datacast associated with broadcast streams with built-in support in the dedicated service module for processing the service information. The dedicated service module can also support software reconfiguration via broadcast at several different levels (e.g., device upgrade, software platform upgrade, and content upgrade).

Signal source 211 can be any device, such as an antennae for receiving a broadcast, a cable interface for line transmission, or a dish for receiving satellite broadcast. Display device 218 of FIG. 2 can be any type of display, including an analog or a digital television, or a personal computer (PC) display. While processor 204 and memory 206 are shown as individual entities, they may be incorporated into another component. For example, processor 204 and memory 206 may be new components or may be existing components in display device 218, e.g. a digital television (DTV), dedicated service module 210, or in a set-top box (not shown). Additionally, while dedicated service module 210 is shown individually, it may be integrated into other components, such as display device 218, as shown in configuration B of subsequent FIG. 3B.

System 200 also includes an optional Internet connection 216 coupled to bus 202 for transmitting information to, and receiving information from, the Internet. The information may be a video segment, such as an A/V dip for example. An optional user input device 212, e.g. a keypad, remote control, etc., coupled to bus 202 is also included in system 200 of FIG. 2, to provide communication between system 200 and a user. Optional local receiver/source 208, which can be a set top box in one embodiment, is coupled to bus 202 to provide a media signal. Optional local receiver/source 208 can alternatively be located inside display device 218. Optional local/receiver source 208 can allow viewer options such as simultaneous viewing of a segment through a tuner or source that is independent of the dedicated tuners of dedicated service module 210. Thus, the dedicated tuner, e.g. 201, in dedicated service module 210, always provides a dedicated path for a given medial signal.

Bus 202 provides an exemplary coupling configuration of devices in on-site media system 200. Bus 202 is shown as a single bus line for clarity. It is appreciated by those skilled in the art that bus 202 can include subcomponents of specific data lines and/or control lines for the communication of commands and data between appropriate devices. It is further appreciated by those skilled in the art that bus 202 can be a parallel configuration, or a IEEE 1394 configuration, that bus 202 can include numerous gateways, interconnect, and translators, as appropriate for a given application.

It is also appreciated that on-site media system 200 is exemplary only and that the present invention can operate within a number of different media systems including a commercial media system, a general purpose computer system, etc. Furthermore, the present invention is well-suited to using a host of intelligent devices that have similar components as exemplary on-site media system 200.

Figure 3A:
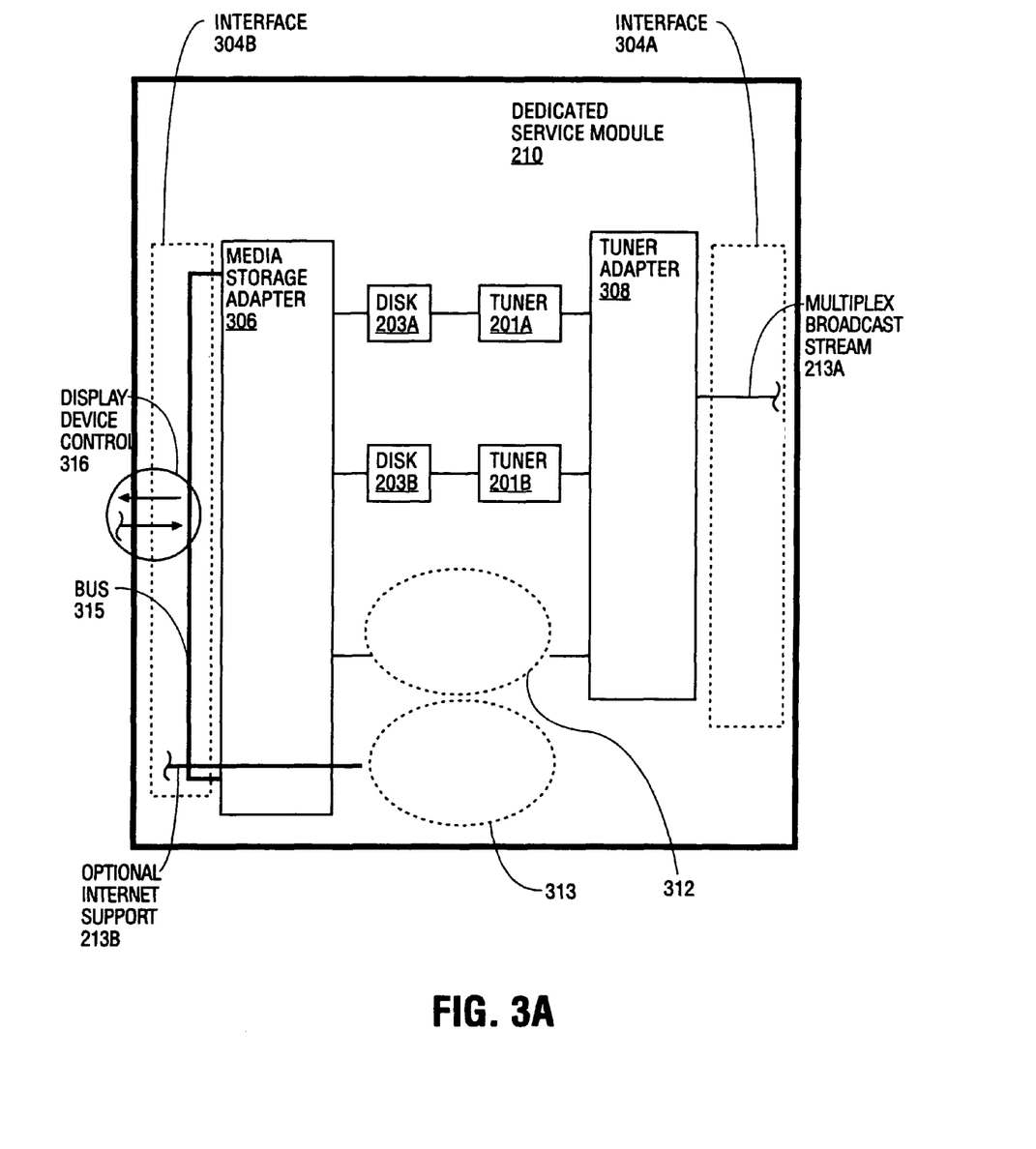
FIG. 3A is a block diagram of data recorded on a dedicated service module.

Referring now to FIG. 3A, a block diagram of a dedicated service module is shown, in accordance with on embodiment of the present invention. Dedicated service module 210, also referred to as a dedicated media device, or a dedicated service cartridge depending upon the configuration, includes a media storage adapter 306, a tuner adapter 308, and interfaces 304a and 304b for tuner adapter 308 and for media storage adapter 306, respectively. Media storage adapter 306 includes appropriate mechanical and electrical components to accommodate a dedicated media storage device. Similarly, tuner adapter 308 includes appropriate mechanical and electrical components to accommodate a dedicated tuner. Media storage adapter 306 is coupled to tuner adapter 308 via one or more dedicated tuners, e.g. tuner 210a, and one or more dedicated disks, e.g. 203a, respectively coupled together in exclusive pairs, in the present embodiment.

Interface 304a, in turn includes a multiplexed broadcast stream 213a coupled to tuner adapter 308. Interface 304b includes a two-way display device control line 316, which can be coupled to media storage adapter 306 via bus 315. In one embodiment, bus 315 can be coupled to bus 202 of FIG. 2. Interface 304b also includes an optional Internet 304b also includes an optional Internet connection 213b that may be directly coupled to one or more dedicated cartridges, e.g. open slot 313, in one embodiment. In another embodiment, only a dedicated storage device is coupled to optional Internet connection 213*b* because the Internet connection bypasses the need for a dedicated tuner.

The present embodiment of dedicated service module 210 includes multiple tuners and disks, exclusively coupled to each other as shown. However, the present invention is well-suited to many different configurations. For example, one or more allocated partitions, or portions, of a single disk can be utilized in lieu of separate storage devices, e.g. one hard drive with five partitions replaces five separate hard drives. In yet another embodiment, a "gang" of multiple tuners could be cooperatively shared across a current active receiver, under the assumption that not all of the multiple broadcast signals would want to be tuned and recorded at all times. In this latter embodiment, each broadcast signal can still have a guaranteed capacity of disk storage. This latter embodiment would trade off the cost of a service module with the level of dedicated service desired.

While the present embodiment arranges multiple tuner-storage pairs, e.g. 203*a* and 201*a* pair and 203*b* and 201*b* pair, in a parallel manner, the present invention is well-suited to alternative coupling arrangements. For example, in one embodiment, tuner-storage pairs may be daisy chained to deliver the multiplex broadcast signal to each dedicated tune.

Bus 315, for providing multiplexed broadcast stream, is conformal to the Institute of Electrical and Electronic Engineers (IEEE) 1394 standard in one embodiment. Furthermore, two-way media/data line 316 is also compatible with the IEEE 1394 standard, in one embodiment.

The connection to the optional local receiver, e.g. optional local receiver/source 208 of FIG. 2 (viz., a tuner in a television or Set Top Box (STB)), enables a viewer to access segmenting from dedicated service module 210 as a set of streams to complement a conventional broadcast from optional local receiver. Furthermore, the present invention is well-suited to using many different configurations of dedicated tuner-storage devices. For example, one or more dedicated media storage devices may be committed to a single dedicated tuner, thus allowing concurrent recording and viewing. Alternative embodiments are provided in subsequent figures.

The present invention also shows one open slot 312 for an additional dedicated tuner-storage pair. However, the present invention is well-suited to providing interactive media device 210 with any number of open slots and any number of installed dedicated tuner-storage pairs.

Additionally, dedicated storage device 210 has a modular interface to media storage adapter 306 and tuner adapter 308 in the present embodiment. That is, the present embodiment of FIG. 3A is a form-factor media tower into which a consumer can plug or unplug dedicated service cartridges, having the dedicated tuners and media storage devices, units.

Figure 3B:
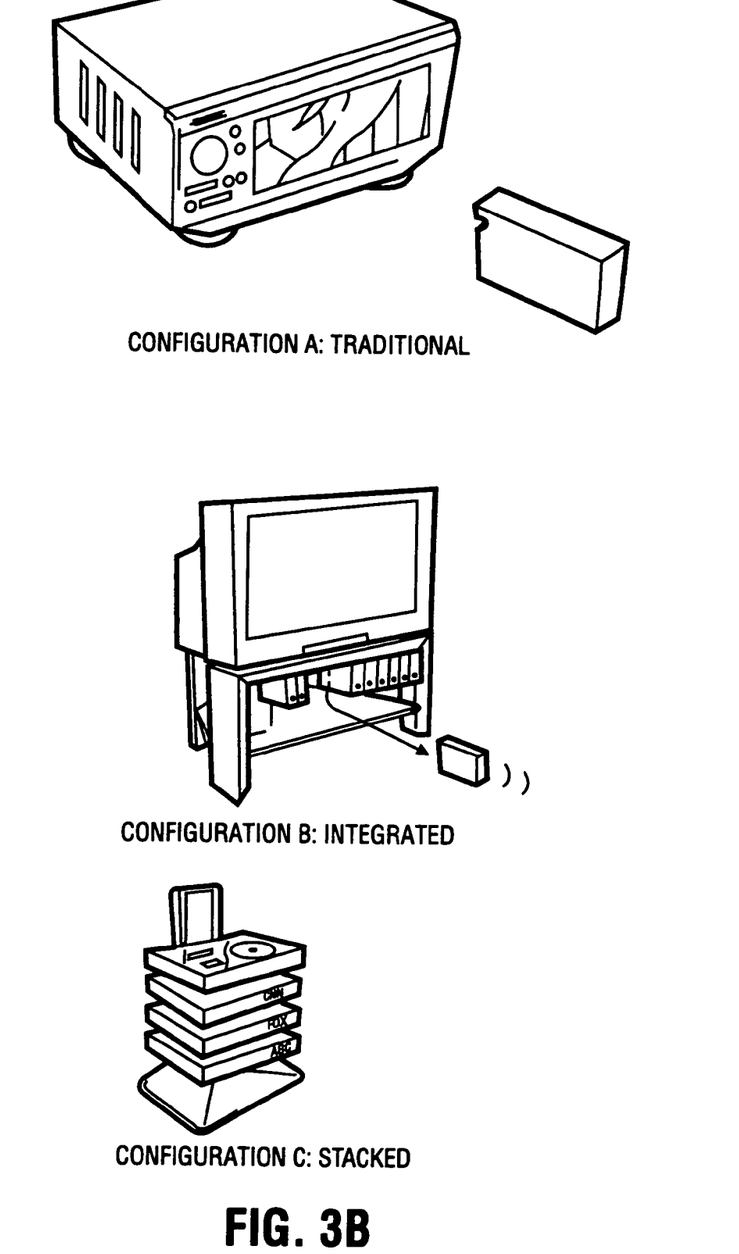
FIG. 3B is a diagram of multiple designs of a dedicated service module.

Referring now to FIG. 3B, multiple designs of a dedicated service module are shown, in accordance with one embodiment of the present invention. Configurations A-C show alternative configurations for a modular embodiment of the dedicated service module, e.g. where the dedicated tuner-disk, pairs are removable cartridges. Configuration A shows a traditional stand alone dedicated service module device. Configurations B shows an integrated dedicated service module that is built-in to a display device. Lastly, configuration C shows a stacked stand alone dedicated service module device. The dedicated tuner-storage pairs can be plugged into a backplane of any device appropriate for consumer use. The present invention is well-suited to using any other stacking and coupling configuration for a modular dedicated service module. It is appreciated that the integrated service module devices shown in FIG. 3B are exemplary. The present invention is well-suited to a wide range of designs and configurations for the dedicated service module and the cartridge embodiment of the dedicated tuner-disk pair.

Figure 4:
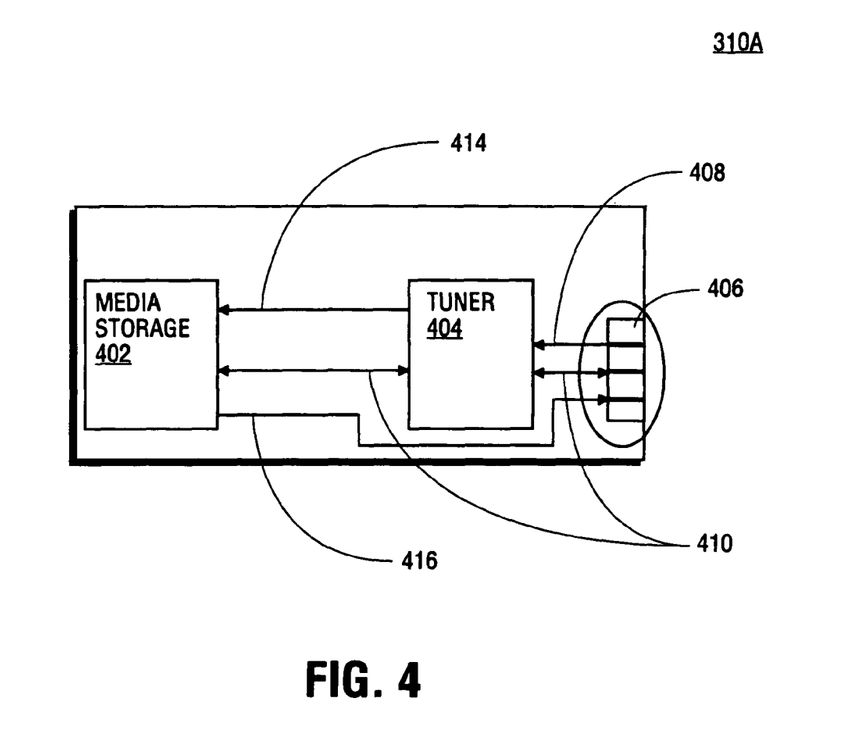
FIG. 4 is a block diagram of another configuration of a dedicated service module.

Referring now to FIG. 4, a block diagram of another configuration of a dedicated service module is shown, in accordance with one embodiment of the present invention. Dedicated service module 310*a*, also referred to as a dedicated service cartridge, includes a media storage device 402, and a tune 404. In the present embodiment, both the media storage device 402 and the tuner 404 to which it is coupled, are dedicated to a specific content provider. For example, tuner 404 may be preset to receive a broadcast frequency corresponding to a national news broadcaster. In another embodiment, dedicated service module 310*a* can be generic cartridge that is segmented with tuning instructions suitable to tune in the appropriate broadcast signal, in response to a subscription, or to some other business module.

Tuner 404 of FIG. 4 is coupled to adapter 406 via data line 408 to receive source signal, e.g. a broadcast spectrum. Media storage device 402 and tuner 404 are coupled via control line 410 to adapter 406 to receive instructions to tuner and/or media storage device in accordance with on-site media service software and commands, e.g. via processor 204 and memory 206 of FIG. 2. Media storage device 402 is also coupled to adapter 406 via line 416 to provide media data from media storage device to a media system, such as that shown in FIG. 2. Line 414 provides the dedicated media signal, tuner by tuner 404, to dedicated media storage 402. In another embodiment, data and control can be multiplexed on a single line. Adapter 406 allows dedicated service module 310*a* to interface with an interactive media system, such as the embodiment shown in FIG. 3A. As mentioned in FIG. 3A, another embodiment of a dedicated service module allows for dedicated Internet access, and thus eliminates the dedicated tuner but retains the dedicated media storage device.

In one embodiment, dedicated service module 310*a* of FIG. 4 is a modular unit that a consumer can purchase and simply insert to an interactive media system. Media storage device 402 is shown as a single device in FIG. 4. However, the present invention is well-suited to using many different configurations and embodiment. In another embodiment, multiple independent read/write access mechanisms can be adapted to a single recording disk for simultaneous read/write aspects. In the present embodiment, media storage device 402 is a hard drive unit, similar to those used in PCs. However, the present invention is well-suited to using any media recording device, as is appropriate for a given application. Additionally, the tuners and disks of the dedicated service module are capable of recording and delivering a fixed number of streams, e.g. for input and output, as appropriate for the service.

While FIG. 4 provides dedicated tuner-storage device 310*a* as a removable modular embodiment, it can also be configured as a fixed internal device for incorporation into a display device, such as digital television. Additionally, tuner 404 can be implemented as a digital or an analog device. While FIG. 4 shows a single media storage device allocated to a single dedicated tuner, the present invention is well-suited to different configurations. For example, in lieu of dedicated an entire media storage device to a single dedicated tuner, one embodiment of the present invention dedicates one or more partitions of a common media storage device to a single dedicated tuner. In this manner, the single common storage device can be shared among multiple tuners while still satiating the goal of guaranteed storage capacity for a broadcast signal.

Figure 5:
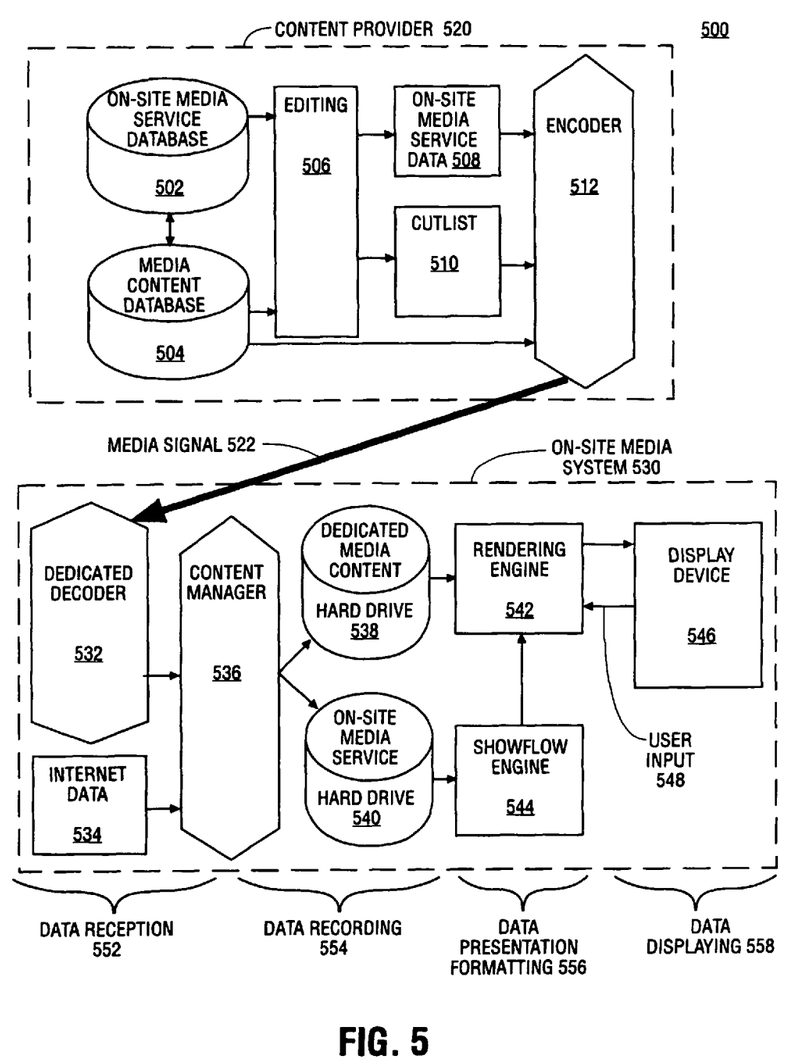
FIG. 5 is a functional block diagram of an interactive media system including content provider and viewer systems with functions.

Referring now to FIG. 5, a functional block diagram of an interactive media system including content provider media system and on-site media system is shown, in accordance with one embodiment of the present invention. Interactive media system 500 includes a content provider media system 520, also referred to as content provider, and includes an on-site media system 530.

Content provider media system 520 includes a media content database 504 that provides media content data, as indicated by the arrows, to an editing block 506 and to an encoder engine block 512. Any format of data can be stored in the media content database 504. For example, in one embodiment, the media content data stored in media content database 504 is compliant with the Moving Picture Experts Group-2 (MPEG-2) standard. Media content database 504 also communicates, as shown by arrow, with on-site media service database 502, which in turn provides data to editing block 506. On-site media service database 502 includes metadata, content options, service data and service options, function data and functional options, and interactive data and interactive options, in one embodiment. However, the present invention is well-suited to storing any other type of data that would enhance the on-site media service. These data may be commands, software code, descriptive structures, or other information useful to an on-site media system. Additionally, the granularity of the on-site media service data can range from segment-based to clip based, or shorter time-segments. Besides the data described, the present invention is well-suited to tying any other on-site media service data to the content data in order to provide an on-site media service that provides value to both content provider and viewer.

Editing block 506 can be thought of as the segment director's editing service which takes the raw production data and formats it into a television segment. The communication link between on-site media service database 502 and media content database 504 ties the on-site media service information to the core broadcast segment content, e.g. a core audiovisual news segment. Editing block 506 passes reference information, relating to the media content desired to be transmitted, to cutlist block 510. The service information corresponding to the desired segment content to be transmitted is sent in parallel from editing block 506 to the on-site media service data block 508. The output of blocks 508 and 510 is provided in parallel with the actual content data, referenced in cutlist block 510, from media content database 504, to an encoder block 512 which subsequently provides a media signal to a user, e.g. on-site media system 530. While the present embodiment performs some editing of raw production media data, it still provides a sufficient amount of content data to a local media system to allow the viewer some options, if desired, in the selection of the content.

In one embodiment, encoder block 512 is a transmitter that provides a terrestrial broadcast of media signal 522. However, the present invention is well-suited to any means of transmitting the media signal, such as cable or satellite. The present invention is also well-suited to a wide variety of methods for encoding data for transmission to an on-site media system.

The present embodiment of content provider interactive media system shown in FIG. 5 can be implemented with hardware that includes a processor coupled to a memory for storing instructions and commands and method steps. The hardware implementation would also include a media storage device such as one or more hard drives coupled to the processor, a user input device and a transmitter, all coupled to the processor.

The other component of interactive media system 500 is on-site media systems 530, which can be grouped in different sections for clarity. A first functional section 552 performs data reception in on-site media system 530. A second functional section 554 performs data recording, while a third functional section 556 performs data presentation. In data reception section 552, broadcast signal 522 is first received at a decoder functional block 532 which transmits, as shown by arrows, the decoded signal to content manager block 536. An optional information source, such as Internet data block 534, can provide additional data that can be integrated in the functional stages of on-site media system 530. Thus, for example, Internet data block 534 can automatically cache a specific Web content prior to viewer presentation in order to give the viewer a sense of instant access during the presentation. Additionally, a back channel can be enabled either via this Internet block or through other mechanisms, such as a cable modem for cable-based broadcast.

Decoder 532 can be a dedicated tuner, such as the dedicated tuner 404 shown in FIG. 4, or the dedicated tuner portion, e.g. tuner 201a of FIG. 3A. Content manager block 536 provides a filtering function on the decoded media signal. That is, content manager block 536 segregates content from on-site media service data and sends them to respective storage devices, e.g. media content hard drive 538 for content data, and on-site media service drive 540. These separate drives are figurative in one embodiment as both signals can be tied together by writing them to a single disk. Content manager block 530 can also implement a first-level content filter that, according to subscription software, user profile, or viewer-selected options, decides whether to record the media signal, e.g. to media content hard drive 538, or to ignore the signal and not record it. Content manager can be implemented using instructions stored on memory 206 and implemented on processor 204 of on-site media hardware system 200, as shown in FIG. 2, in one embodiment.

The next stage of on-site media system 530 is the data presentation formatting stage 556. In this stage, on-site media service information is received from on-site media service drive 540 at showflow engine block 544. Showflow engine block 544 formats and implements on-site media service data for subsequent integration with content data. Then showflow engine block 544 provides the processed data to rendering engine 542. Similarly, content data is received from dedicated media content hard drive 538 at rendering engine 542. Rendering engine 542 performs the formatting and integration of the desired images to be viewed on display device, in one embodiment. A wide variety of media elements, e.g. video, audio, text, etc., may be combined in many different formats to provide a desired composite presentation for viewing on display device 546. For example, electronic segmenting guide (EPG) information may be more dynamically formatted, including clips from the actual segment. That is, the EPG can be enabled via the present invention to allow users to view previews of any segment for which a commercial has been broadcast instead of the typical text tile of a segment in a two-dimensional grid. In another embodiment, a user segment interface that presents menus, media clips, or other data, may be overlaid onto content images for display device 546.

Rendering engine 542 transfers presentation data to display device 546 for the final stage of presenting display 558. User input is communicated back to rendering engine 542 via line 548. User input can be received via push-button selection on set-top box or a television unit, or from an other source, such as a remote control input.

While the present embodiment only shows a single decoder 532 and a single dedicated hard drive, e.g. disk set 538 and 540, dedicated for a single media signal, e.g. signal 522, the present invention is capable of functional blocks for multiple units in parallel, in one embodiment. In another embodiment, memory and processor resources (e.g. memory 206 and processor 204 of FIG. 2) are utilized to accomplish engine functions (e.g. rendering engine 542, content manager function 536, and showflow engine 544, as well as other engines not shown). It is appreciated that the engine functions performed on memory and processor are accomplished in a serial manner if only a single processor is implemented. In another embodiment, multiple processors can be utilized to accomplish dedicated functions in on-site media system 530, in a parallel or serial fashion.

Figure 6A:
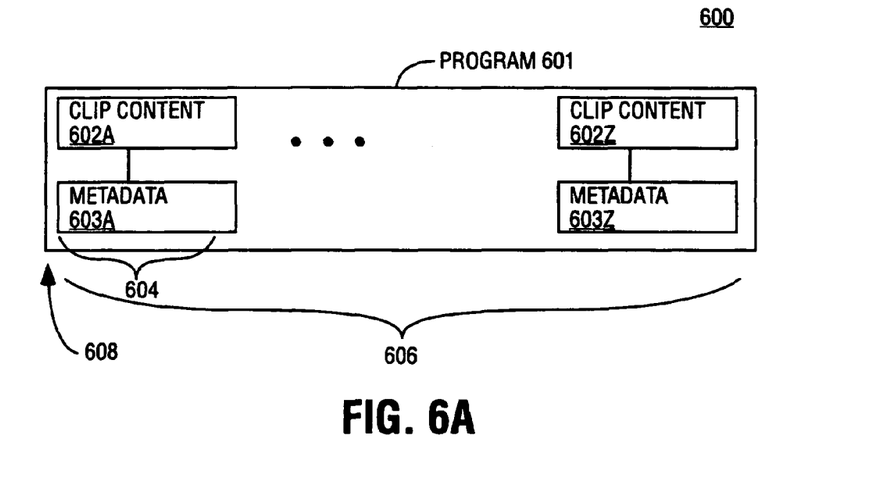
FIG. 6A is a diagram of a fine-grain media stream.

Referring now to FIG. 6A, a diagram of a fine-grain media stream 600 is shown, in accordance with one embodiment of the present invention. FIG. 6A illustrates segment data and duration as a physical block 601. Segment block 601 has a time span 606 over which content is presented. The present invention provides a very fine grain metadata tagging for segment content. For example, FIG. 6A shows metadata labeling at a clip level, e.g. metadata tag 603a for clip content 602a having a time span of 604. This is repeated for any quantity of clips within the segment. The present invention is well-suited to using any scale of metadata labeling, as appropriate for an application. For example, tagging clips with metadata would be appropriate for some news segments having many short clips in the segment. By using the fine-grain metadata tagging, the present invention provides the necessary data and infrastructure for an on-site media service to provide enhanced services and functions to a viewer. One such feature would be fine-grain navigation and compilation of media content related to a specific viewer interest or inquiry.

Figure 6B:
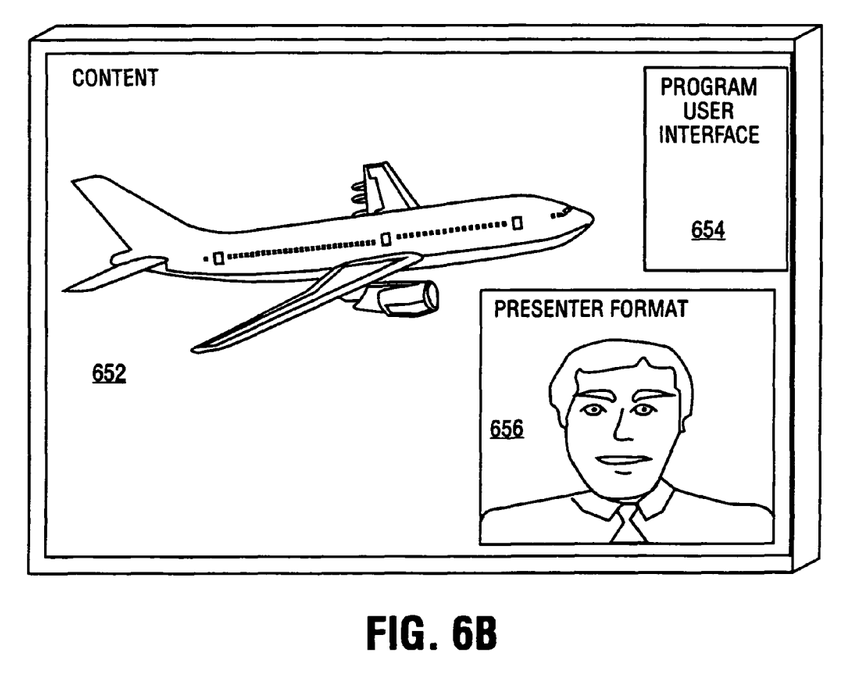
FIG. 6B is a television view generated using the interactive media system.

Referring to now to FIG. 6B, a television view generated using the interactive media system is shown, in accordance with one embodiment of the present invention. Television view 650 is shown on a conventional television 658. Segment user interface 654 is provided along with a presenter 656 image, both of which are overlaid onto a core media content 652, e.g., an airplane story clip. The present invention provides the appropriate audio and associated data corresponding to the video data. Notably, the content-provider can exercise editorial content over when and what service, function, and content options are available to the viewer, e.g. through the segment user interface. This allows greater choice to a viewer while still satisfying a business model for the content provider.

Television view 650 illustrates how the content provider, e.g. broadcaster, can control some of the recording, management formatting, and presentation of media to a user. Similarly, television view 650 illustrates how the viewer can interact with predetermined menu options to accomplish desired services and features, e.g. viewing segment user interface for alternative clips, selecting a function from a menu in segment user interface 654, or adjusting the presenter format 656. The present invention is well-suited to using any combination of these, and other, presentation formats and contents to present an on-site media service to the viewer, and or user. Furthermore, each of the several on-site media services described can be implemented independent of each other, or in any combination. The same independence exists for the interactive feature of the on-site media service.

The method can be implemented in an environment with software controlled access to streamed media, where descriptive Metadata is used to relate teaser AV material to full length versions of the corresponding content.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A computerized method comprising:
receiving, by an on-site media system, a plurality of teasers and a plurality of different media segments from a content provider, the received media segments to be presented in a current presentation order, wherein each of the plurality of teasers is an audio/video teaser;
sequentially presenting a video component of each of the plurality of teasers on a local display, wherein the sequential presentation is a temporal sequential presentation;
receiving a bookmark signal associated with a presented teaser during the sequential presentation of the video component of the presented teaser, wherein a media segment associated with the presented teaser is marked in response to receiving the bookmark signal;
dynamically changing, in response to receiving the bookmark signal, a presentation position of the marked media segment in the current presentation order; and
presenting the plurality of different media segments in the changed presentation order, wherein the marked media segment is presented before an unmarked and different media segment is presented and the plurality of media segments is presented subsequent to the presentation of the plurality of teasers.

2. The method of claim 1, wherein the bookmark signal marks a media segment as of interest.

3. The method of claim 1, wherein the bookmark signal marks a media segment as not of interest.

4. The method of claim 3, wherein the changed presentation order comprises not presenting the marked media segment.

5. The method of claim 1, wherein receiving the plurality of teasers comprises using a disk/tuner cartridge.

6. The method of claim 1, wherein receiving the plurality of media segments comprises using a disk/tuner cartridge.

7. The method of claim 1, wherein the teaser is associated with multiple media segments.

8. The method of claim 1, wherein multiple teasers are associated with multiple media segments.

9. A non-transitory machine readable medium having executable instructions to cause a processor to perform a method comprising:
receiving, by an on-site media system, a plurality of teasers and a plurality of different media segments from a content provider, the received media segments to be presented in a current presentation order, wherein each of the plurality of teasers is an audio/video teaser;
presenting a video component of each of the plurality of teasers on a local display, wherein the sequential presentation is a temporal sequential presentation;
receiving a bookmark signal associated with a presented teaser during the sequential presentation of the video component of the presented teaser, wherein a media segment associated with the presented teaser is marked in response to receiving the bookmark signal;
dynamically changing, in response to receiving the bookmark signal, a presentation position of the marked media segment in the current presentation order; and
presenting the plurality of different media segments in the changed presentation order, wherein the marked media segment is presented before an unmarked and different media segment is presented and the plurality of media segments is presented subsequent to the presentation of the plurality of teasers.

10. The non-transitory machine readable medium of claim 9, wherein the bookmark signal marks a media segment as of interest.

11. The non-transitory machine readable medium of claim 9, wherein the bookmark signal marks a media segment as not of interest.

12. The non-transitory machine readable medium of claim 11, wherein the changed presentation order comprises not presenting the marked media segment.

13. The non-transitory machine readable medium of claim 9, wherein receiving the plurality of teasers comprises using a disk/tuner cartridge.

14. The non-transitory machine readable medium of claim 9, wherein receiving the plurality of media segments comprises using a disk/tuner cartridge.

15. The non-transitory machine readable medium of claim 9, wherein the teaser is associated with multiple media segments.

16. The non-transitory machine readable medium of claim 9, wherein multiple teasers are associated with multiple media segments.

17. A system comprising:
a disk/tuner cartridge to receive, by an on-site media system, a plurality of teasers and a plurality of different media segments from a content provider, the received media segments to be presented in a current presentation order, wherein each of the plurality of teasers is an audio/video teaser; and
a processor to sequentially present a video component of each of the plurality of teasers, wherein the sequential presentation is a temporal sequential presentation, wherein the disk-tuner cartridge receives a bookmark signal associated with a presented teaser during the sequential presentation of the video component of the presented teaser, marks a media segment associated with the presented teaser in response to receiving the bookmark signal and dynamically changes, in response to receiving the bookmark signal, a presentation position of the marked media segment in the current presentation order, the plurality of different media segments are presented by the processor in the changed presentation order, wherein the marked media segment is presented before an unmarked and different media segment is presented and the plurality of media segments is presented subsequent to the presentation of the plurality of teasers.

18. The system of claim 17, wherein the bookmark signal marks a media segment as of interest.

19. The system of claim 17, wherein the bookmark signal marks a media segment as not of interest.

20. The system of claim 19, wherein the changed presentation order comprises not presenting the marked media segment.

21. The system of claim 17, wherein the teaser is associated with multiple media segments.

22. The system of claim 17, wherein multiple teasers are associated with multiple media segments.

23. An apparatus comprising:
means for receiving a plurality of teasers and a plurality of different media segments, the received media segments to be presented in a current presentation order, wherein each of the plurality of teasers is an audio/video teaser;
means for sequentially presenting a video component of each of the plurality of teasers on a local display, wherein the sequential presentation is a temporal sequential presentation;
means for receiving a bookmark signal associated with a presented teaser during the sequential presentation of the video component of the presented teaser, wherein a media segment associated with the presented teaser is marked in response to receiving the bookmark signal;
means for dynamically changing, in response to receiving the bookmark signal, a presentation position of the marked media segment in the current presentation order; and
means for presenting the plurality of different media segments in the changed presentation order, wherein the marked media segment is presented before an unmarked and different media segment is presented and the plurality of media segments is presented subsequent to the presentation of the plurality of teasers.

24. The apparatus of claim 23, wherein the bookmark signal marks a media segment as of interest.

25. The apparatus of claim 24, wherein the bookmark signal marks a media segment as not of interest.

26. The apparatus of claim 25, wherein the changed presentation order comprises not presenting the marked media segment.

27. The apparatus of claim 23, wherein the means for receiving the plurality of teasers comprises using a disk/tuner cartridge.

28. The apparatus of claim 23, wherein the means for receiving the plurality of media segments comprises using a disk/tuner cartridge.

29. The apparatus of claim 23, wherein the teaser is associated with multiple media segments.

30. The apparatus of claim 23, wherein multiple teasers are associated with multiple media segments.

* * * * *